United States Patent
Wensing et al.

(10) Patent No.: US 9,541,134 B2
(45) Date of Patent: Jan. 10, 2017

(54) PINION BEARING ARRANGEMENT

(75) Inventors: Jeroen Wensing, Houten (NL); Ian Peverill, Beds (GB); Paul Meaney, Schwarzach-am-Main (DE)

(73) Assignee: AKTIEBOLAGET SKF, Gothenburg (SE)

( * ) Notice: Subject to any disclaimer, the term of this patent is extended or adjusted under 35 U.S.C. 154(b) by 149 days.

(21) Appl. No.: 14/385,334

(22) PCT Filed: Mar. 15, 2012

(86) PCT No.: PCT/EP2012/001177
§ 371 (c)(1),
(2), (4) Date: Dec. 8, 2014

(87) PCT Pub. No.: WO2013/135254
PCT Pub. Date: Sep. 19, 2013

(65) Prior Publication Data
US 2015/0110434 A1   Apr. 23, 2015

(51) Int. Cl.
*F16C 33/32* (2006.01)
*F16C 33/62* (2006.01)
(Continued)

(52) U.S. Cl.
CPC .............. *F16C 33/62* (2013.01); *F16C 19/166* (2013.01); *F16C 33/32* (2013.01); *F16C 33/64* (2013.01);
(Continued)

(58) Field of Classification Search
CPC .. F16C 19/541–19/543; F16C 19/546–19/548; F16C 2204/60; F16C 19/64; F16C 19/66; F16C 19/70; F16C 2240/76; F16C 2326/01
See application file for complete search history.

(56) References Cited

U.S. PATENT DOCUMENTS 2,135,477 A * 11/1938 Griswold .............. F16C 19/548
184/6.12
6,398,420 B1 * 6/2002 Tanaka .................... F16C 33/62
384/492
(Continued)

FOREIGN PATENT DOCUMENTS

| EP | 1571356 A1 | | 9/2005 |
|---|---|---|---|
| GB | 712692 | * | 7/1954 |
| WO | 2008053226 A1 | | 5/2008 |

*Primary Examiner* — James Pilkington
(74) *Attorney, Agent, or Firm* — Bryan Peckjian; SKF USA Inc. Patent Dept.

(57) ABSTRACT

A pinion bearing arrangement of a gearbox for a vehicle or aircraft, providing at least one roller bearing. At least one of the roller bearings is a ball bearing, having an inner ring and an outer ring, wherein both rings have raceways for balls being located between the rings. To ensure a sufficient lifetime of the roller bearings the invention includes that at least one of the rings is made from a ball bearing steel produced by a powder metallurgical process using a powder metallurgy component including 0.5 to 2.0 weight-% C, a maximum of 0.035 weight-% S, 3.0 to 5.0 weight-% Cr, 1.0 to 4.0 weight-% V, 1.0 to 12.0 weight-% W and 2.0 to 12.0 weight-% Mo, wherein at least one raceway has a radius ($r_{I/O}$) and the balls have a diameter ($D_B$) which fulfill the equation: $r_{I/O}/D_B > 0.53$.

14 Claims, 4 Drawing Sheets

(51) Int. Cl.
*F16C 19/16* (2006.01)
*F16C 33/64* (2006.01)

(52) U.S. Cl.
CPC ........ *F16C 2202/02* (2013.01); *F16C 2202/04* (2013.01); *F16C 2202/10* (2013.01); *F16C 2204/64* (2013.01); *F16C 2204/66* (2013.01); *F16C 2240/76* (2013.01); *F16C 2326/01* (2013.01)

(56) References Cited

U.S. PATENT DOCUMENTS

| | | | | |
|---|---|---|---|---|
| 6,524,008 | B1* | 2/2003 | Yatabe | F16C 33/58 |
| | | | | 384/450 |
| 6,827,496 | B2* | 12/2004 | Iwata | F16C 19/166 |
| | | | | 384/516 |
| 7,018,107 | B2 | 3/2006 | Beswick et al. | |
| 7,597,482 | B2* | 10/2009 | Fukuda | F16C 19/182 |
| | | | | 384/504 |
| 2008/0193072 | A1* | 8/2008 | Hattori | F16C 19/163 |
| | | | | 384/571 |
| 2011/0235958 | A1 | 9/2011 | Norimatsu | |

\* cited by examiner

PINION BEARING ARRANGEMENT

CROSS REFERENCE TO RELATED APPLICATION

This is a National Stage application claiming the benefit of International Application Number PCT/EP2012/001177 filed on 15 Mar. 2012, which is herein incorporated by reference in its entirety.

TECHNICAL FIELD

The invention relates to a pinion bearing arrangement of a gearbox for a vehicle or aircraft, comprising at least one roller bearing, wherein at least one of the roller bearings is a ball bearing, which ball bearing has an inner ring and an outer ring, wherein both ring have raceways for balls being located between the rings.

BACKGROUND

Such a pinion bearing arrangement is usually employed for supporting a pinion shaft in a gearbox of a vehicle. For usual applications in cars existing bearing arrangements are well developed to support the pinion precisely for a sufficient time of operation.

This is not necessarily the case with regard to pinion bearing arrangements which are operated under extreme loads, like e.g. the pinion bearings in a racing car, specifically in a Formula 1 racing car. Also here, a certain time of operation must be guaranteed. Due to the nature of such an application it is an important additional aspect to minimize the friction in the bearing during operation.

It is an object of the invention to propose a pinion bearing arrangement which guarantees a desired life time but reduces the friction in the bearing significantly.

SUMMARY OF THE INVENTION

A solution according to the invention is characterized in that at least one of the rings of the ball bearing is made from a ball bearing steel produced by a powder metallurgical process using a powder metallurgy component including
  0.5 to 2.0 weight-% C (Carbon),
  a maximum of 0.035 weight-% S (Sulfur),
  3.0 to 5.0 weight-% Cr (Chromium),
  1.0 to 4.0 weight-% V (Vanadium),
  1.0 to 12.0 weight-% W (Wolfram) and
  2.0 to 12.0 weight-% Mo (Molybdenum),
wherein at least one raceway has a radius and the balls have a diameter which fulfill the equation:

$$r_{I/O}/D_B > 0.53.$$

Preferably, the powder metallurgy component including
  1.3 to 1.4 weight-% C (Carbon),
  a maximum of 0.035 weight-% S (Sulfur),
  3.50 to 4.25 weight-% Cr (Chromium),
  1.75 to 2.20 weight-% V (Vanadium),
  5.75 to 6.50 weight-% W (Wolfram) and
  10.0 to 11.0 weight-% Mo (Molybdenum).

The powder metallurgy component can also include 5.0 to 12.0 weight-% Co.

The total amount of all parts of the powder metallurgy component, possibly including unavoidable contaminants, is 100.0 weight-%.

The mentioned steel composition according to the second example is known as such as M62 steel. For details reference is made to U.S. Pat. No. 7,018,107 B2.

The above mentioned ratio between the radius of the raceway and the diameter of the ball defines the osculation between the balls and the raceway in which the ball is running.

Preferably, both of the rings of the ball bearing are made from the ball bearing steel produced by a powder metallurgical process.

The surface of the raceways has preferably a hardness between 65 HRC and 70 HRC.

At least one of the bearings can be a Deep Groove Ball bearing (DGBB). Alternatively, at least one of the bearings can be an Angular Contact Ball Bearing (ACBB); single or double row ACBBs are possible. As a further alternative, it is possible and preferred that at least one of the bearings is a Four Point Contact Ball Bearing (FPCB).

A preferred embodiment of the invention comes up with two ball bearings which are arranged adjacent to another to support a shaft of the pinion.

In this case, a first ball bearing can be arranged at an outboard side (directed to the bevel gear of the pinion) and a second ball bearing can be arranged at an inboard side (remote from the bevel gear of the pinion) relatively to a bevel gear of the pinion to be supported, wherein at least one raceway of the first bearing fulfill the equation:

$$r_{I/O}/D_B > 0.54,$$

and wherein at least one raceway of the second bearing fulfills the equation:

$$r_{I/O}/D_B > 0.53.$$

Also, as an alternative the inboard and outboard bearings can also be changed with respect to the different osculations. In general, it can be said that it is beneficial that the most critical bearing is equipped with the smaller value for the osculation and the other bearing has the bigger value for the osculation.

The contact angles of the two ball bearings of the ACBB can be different.

The two inner rings of the two bearings can be made as a one-piece element, i.e. an inner ring member can have two raceways for a double row arrangement. Alternatively, the two outer rings of the two bearings can be made as a one-piece element.

The balls of the at least one ball bearing can be made of ceramic material.

According to a preferred application, the pinion bearing arrangement is part of a racing car, especially of a Formula 1 racing car.

Another preferred application is a gear box for an aircraft, especially for a helicopter.

The proposed invention provides a pinion bearing arrangement which is able to carry high loads and which is designed to operate reliable during a desired lifetime. In spite of this, the friction is significant lower compared with pre-known concepts.

While a PM62 steel of the kind mentioned above offers a long bearing life the present invention does not use this effect to prolong the lifetime of the bearing for the preferred application but uses the possibilities of the mentioned steel to significantly reduce the friction in the bearing.

The friction of a pinion bearing is normally the highest in a gear box. It was found that the reduction of friction in the preferred application of a racing car gives a significant power reduction due to lower friction.

The steel has a high material hardness between 65 and 70 HRC. Also, the material has a good toughness as known from other bearing steels (e.g. grade 3 steel no. 52100). The steel is more resistant against surface fatigue and can carry maximum contact stresses which are about 20% higher of a given application load cycle than other high performance steels (grade 3 steel or M50 steel). For equal fatigue strength the bearings show a significant lower friction by opening the ball raceway osculation as defined above. Hereby, the friction can be reduced 40% to 60%; a respective friction power reduction is possible which provides more power for the driving of the car.

That is, the gain in allowable contact stress for a given service life is used according to the invention for the friction reduction.

In a racing car as used in accordance with a preferred application of the concept according to the present invention two thin section ACBB with ceramic balls are employed to support the pinion shaft in the gearbox. All bearing inner and outer rings can be manufactured from the proposed PM62 steel, which are preferably equipped as said with a hardness between 65 and 70 HRC.

The opening of the osculation between the raceways and the balls will increase the maximum contact stresses in the bearing. The highest contact stresses are generated on the inner ring. Due to the design according to the invention a sufficient lifetime is maintained in spite of the described effect. That is, the life or operation time of the bearing is not sacrificed for the improved friction performance.

It is also possible to combine one of the described ball bearings with a taper roller bearing. Here, a double row unit can be employed with one taper row and one ball row.

So, the friction of the pinion bearing can be further reduced while maintaining its life and reliability especially for applications with high gearbox loads.

Thus, if a vehicle—especially a Formula 1 racing car—is equipped with bearing arrangements according to the invention it will have a lower pinion friction; the vehicle will be more efficient either with respect to consumption of fuel and/or with respect to a higher acceleration and speed.

BRIEF DESCRIPTION OF THE DRAWINGS

The drawings show an embodiment of the bearing arrangement according to the invention.

DETAILED DESCRIPTION OF THE INVENTION

Figure 1:
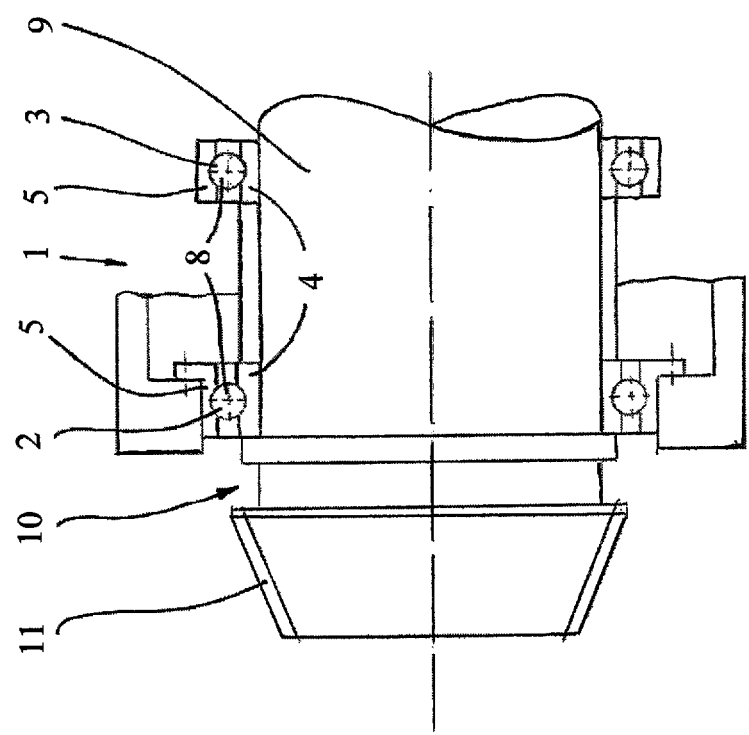
FIG. 1 shows a cross sectional view of a pinion bearing arrangement according to an embodiment of the invention.

In FIG. 1 a pinion bearing arrangement 1 is shown by which a pinion 10 with a shaft 9 and a bevel gear 11 is supported in the housing of a gear box. The shaft 9 of the pinion 10 is supported in two roller bearings 2 and 3 which are both designed as angular contact ball bearings ACBB. The ball bearing 2 which is arranged adjacent to the bevel gear 11 is the outboard bearing; the ball bearing 3 which is arranged remote from the bevel gear 11 is the inboard bearing.

Both ball bearings 2, 3 have respective inner rings 4 and outer rings 5. Between the rings 4, 5 balls 8 made from ceramics are arranged. The inner ring 4 and the outer ring 5 have raceways 6 and 7 respectively for the balls 8 (see FIG. 2).

Figure 2:
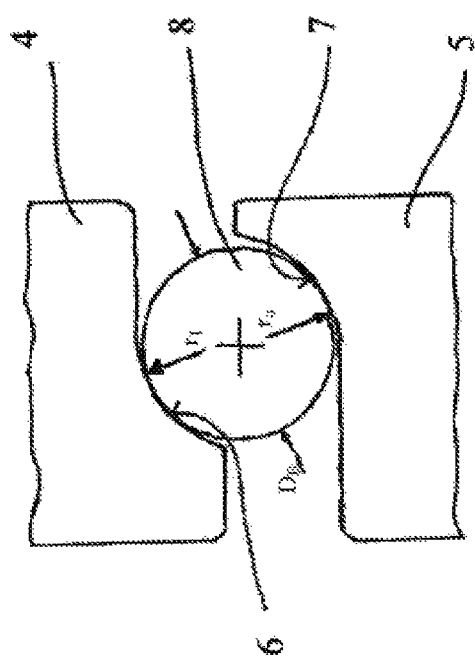
FIG. 2 shows an enlarged view of a region of a ball bearing which is a part of the pinion bearing arrangement.

In FIG. 2 the geometrical relations between the raceways of the bearing rings and the balls are depicted. The balls 8 have a diameter $D_B$. The radius of the raceway of the inner ring 4 is denoted with $r_I$. The radius of the raceway of the outer ring 5 is denoted with $r_O$.

The ratio between the radius of the raceway of the inner or outer ring and the diameter of the balls is the osculation between ring and ball and is according to the invention:

$$r_{I/O}/D_B > 0.53.$$

In a specific embodiment of the invention the osculation between the raceway of the inner ring 4 and the balls 8 and the osculation between the raceway of the outer ring 5 and the balls 8 are substantial equal, but there are differences between the two bearings 2 and 3. The outboard bearing 2 has an osculation of $r_{I/O}/D_B > 0.54$, while the inboard bearing 3 has a smaller osculation of $r_{I/O}/D_B > 0.53$.

The mentioned ratio of osculation of the outboard bearing 2 is preferably between 0.54 and 0.545; the mentioned ratio of osculation of the inboard bearing 3 is preferably between 0.53 and 0.535.

All mentioned ratios for the osculation remain preferably below 0.55.

Figure 3:
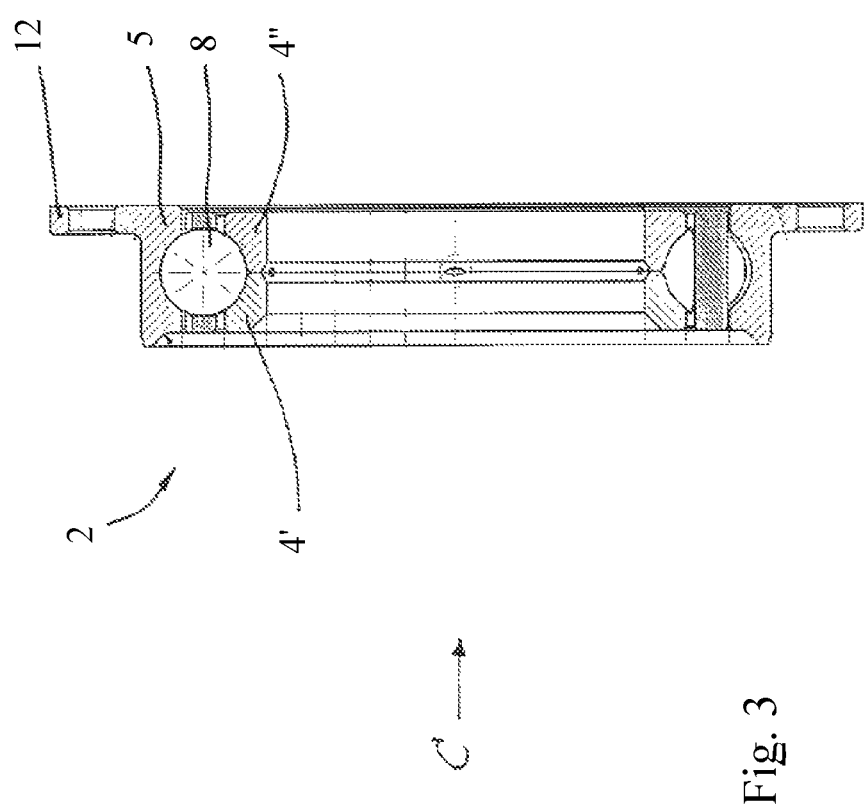
FIG. 3 shows a cross sectional view of one of the bearings of the pinion bearing arrangement and FIG. 4 shows the view "C" according to FIG. 3 of the bearing.
Figure 4:
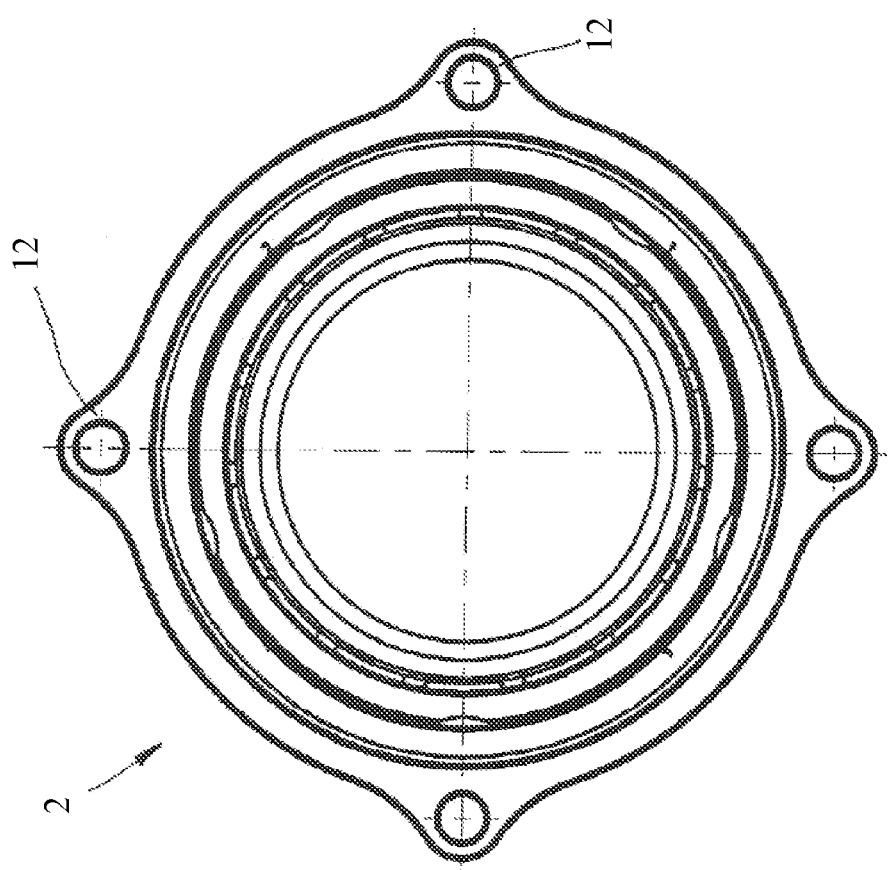

In FIG. 3 and FIG. 4 an alternative solution for the bearings is shown. Here, the bearing 2 is designed as a Four Point Contact Bearing (FPCB). The bearing 2 has two inner rings 4' and 4" being arranged adjacent to another. The outer ring 5 has flange elements 12 as can be seen from the synopsis of FIG. 3 and FIG. 4. This facilitates the fixation of the bearing 2 at the housing of the gearbox.

REFERENCE NUMERALS

1 Pinion bearing arrangement
2 Roller bearing (Ball bearing)
3 Roller bearing (Ball bearing)
4 Inner ring
4' First inner ring
4" Second inner ring
5 Outer ring
6 Raceway
7 Raceway
8 Ball
9 Shaft
10 Pinion
11 Bevel gear
12 Flange element
$r_I$ Radius of the raceway of the inner ring
$r_O$ Radius of the raceway of the outer ring
$D_B$ Diameter of the ball

The invention claimed is:
1. A gearbox for a vehicle or aircraft, comprising:
a pinion comprising a shaft and a bevel gear,
a pinion bearing arrangement comprising a first roller bearing and a second roller bearing located on the shaft, the first roller bearing comprises a first outer raceway, a first inner raceway, and a first set of rolling elements therebetween and the second roller bearing comprises a second outer raceway, a second inner raceway, and a second set of rolling elements therebetween, wherein at least one of the first roller bearing and the second roller bearing is a ball bearing and wherein at least one of the first inner raceway, the first outer raceway, the second inner raceway, and the second outer raceway is made from a ball bearing steel produced by a powder metallurgical process using a powder metallurgy component including 0.5 (zero point five) to 2.0 (two point zero) weight-% C,
a maximum of 0.035 (zero point zero three five) weight-% S,
3.0 (three point zero) to 5.0 (five point zero) weight-% Cr,
1.0 (one point zero) to 4.0 (four point zero) weight-% V,
1.0 (one point zero) to 12.0 (twelve point zero) weight-% W and
2.0 (two point zero) to 12.0 (twelve point zero) weight-% Mo,
wherein both the first outer raceway and the first inner raceway have a first radius ($r_{1/O}$) and the first set of rolling elements have a first diameter ($D_B$) which fulfill the equation:

0.545 (zero point five four five)$>r_{1/O}/D_B>$0.54 (zero point five four)

wherein both the second outer raceway and the second inner raceway have a second radius ($r_{2I/2O}$) and the second set of rolling elements have a second diameter ($D_{2B}$) which fulfill the equation:

0.535 (zero point five three five)$>r_{2I/2O}/D_{2B}>$0.53 (zero point five three), and wherein the first roller bearing is located closer to the bevel gear than the second roller bearing.

2. The gearbox according to claim 1, wherein the powder metallurgy component includes
1.3 (one point three) to 1.4 (one point four) weight-% C,
a maximum of 0.035 (zero point zero three five) weight-% S,
3.50 (three point five zero) to 4.25 (four point two five) weight-% Cr,
1.75 (one point seven five) to 2.20 (two point two zero) weight-% V,
5.75 (five point seven five) to 6.50 (six point five zero) weight-% W and
10.0 (ten point zero) to 11.0 (eleven point zero) weight-% Mo.

3. The gearbox according to claim 1, wherein the powder metallurgy component includes 5.0 (five point zero) to 12.0 (twelve point zero) weight-% Co.

4. The gearbox according to claim 1, wherein all of the first inner raceway, the first outer raceway, the second inner raceway, and the second outer raceway are made from the ball bearing steel produced by the powder metallurgical process.

5. The gearbox according to claim 1, wherein a surface of each of the first inner raceway, the first outer raceway, the second inner raceway, and the second outer raceway has a hardness between 65 (sixty five) HRC and 70 (seventy) HRC.

6. The gearbox according to claim 1, wherein at least one of the first and second roller bearings is a Deep Groove Ball bearing (DGBB).

7. The gearbox according to claim 6, wherein the first and second roller bearings are arranged adjacent to another to support the shaft of the pinion.

8. The gearbox according to claim 7, wherein the first roller bearing is a first ball bearing arranged at an outboard side and the second roller bearing is a second ball bearing arranged at an inboard side relatively to the bevel gear of the pinion.

9. The gearbox according to claim 7, wherein the first inner raceway and the second inner raceway are formed on a first inner ring and a second inner ring, respectively, and wherein the first inner ring and the second inner ring are each a one-piece element.

10. The gearbox according to claim 7, wherein the first outer raceway and the second outer raceway are formed on a first outer ring and a second outer ring, respectively, and wherein the first outer ring and the second outer ring are each a one-piece element.

11. The gearbox according to claim 1, wherein at least one of the first and second roller bearings is an Angular Contact Ball Bearing (ACBB).

12. The gearbox according to claim 11, wherein both of the first and second roller bearings are the Angular Contact Ball Bearings, and contact angles of the first and second roller bearings are different.

13. The gearbox according to claim 1, wherein at least one of the first and second roller bearings is a Four Point Contact Bearing (FPCB).

14. The gearbox according to claim 1, wherein at least one of the first and second roller bearings comprises a plurality of balls made of a ceramic material.

* * * * *